US006344700B1

(12) United States Patent
Eisenhauer et al.

(10) Patent No.: US 6,344,700 B1
(45) Date of Patent: Feb. 5, 2002

(54) REDUNDANT ELECTRICAL DC POWER SYSTEM FOR AIRCRAFT

(75) Inventors: Mark Paul Eisenhauer, Fort Worth, TX (US); Gary Bowman, Swarthmore, PA (US)

(73) Assignees: Bell Helicopter Textron Inc., Fort Worth, TX (US); Boeing Company, Seattle, WA (US)

( * ) Notice: Subject to any disclaimer, the term of this patent is extended or adjusted under 35 U.S.C. 154(b) by 0 days.

(21) Appl. No.: 09/411,616

(22) Filed: Oct. 1, 1999

(51) Int. Cl.[7] .................................................. H02J 9/00

(52) U.S. Cl. ......................... 307/64; 244/7 A; 290/1 C; 307/80

(58) Field of Search ............................. 307/64, 80, 18, 307/22, 23, 125, 126, 150; 244/7 A, 12.4, 56; 290/1 C; 322/7, 9, 22, 23

(56) References Cited

U.S. PATENT DOCUMENTS 4,708,030 A 11/1987 Cordner ....................... 74/686
5,899,411 A 5/1999 Latos ....................... 244/53 A
6,018,233 A * 1/2000 Glennon ....................... 322/22

FOREIGN PATENT DOCUMENTS

WO WO 99/00596 1/1999 ........... F02N/11/04

* cited by examiner

*Primary Examiner*—Fritz Fleming
*Assistant Examiner*—Robert L. Deberadinis
(74) *Attorney, Agent, or Firm*—Gardere Wynne Sewell, LLP; Sanford E. Warren, Jr.; Kenneth T. Emanuelson

(57) ABSTRACT

A DC electrical power generation system for aircraft having primary and emergency generation systems is disclosed. The system includes a transmission driven power generator, a dedicated generator control unit and a distribution network for providing sufficient capacity to all electrical loads on the aircraft. The emergency power system includes at least one engine driven starter generators, with an associated controller unit and associated distribution network for providing sufficient backup capacity to electrical loads assigned thereto.

14 Claims, 3 Drawing Sheets

REDUNDANT ELECTRICAL DC POWER SYSTEM FOR AIRCRAFT

TECHNICAL FIELD OF THE INVENTION

The present invention is directed to aircraft electrical power systems and, more particularly, to a redundant electrical DC power generation system for aircraft.

BACKGROUND OF THE INVENTION

All aircraft are required to have backup power systems. Previous DC power systems used starter generators as the normal means of powering electrical equipment with batteries serving as emergency backup power sources. Some systems used auxiliary power units (APUs) for engine starting and emergency power. Other systems use transmission, hydraulic or ram air driven generators for emergency power.

The aircraft industry has previously built power systems that have starter generators as a normal power source and a battery as a backup source. Most power systems use starter generators (one per engine). An electrical starter generator starts the aircraft engines. Once started, the engines cause power generation through the starter generators resulting in the provision of electrical power to busses through line contacts. A typical twin engine starter generator power system would consist of two starter generators, one per engine. A starter generator would be used for starting the first engine and for providing, for example, electrical power to the left hand busses. A second generator would be used for starting the second engine and providing power to the right hand busses. Power distribution is split up in this manner for the purpose of sharing the distribution load during normal operation, and for providing backup in the event of a failure of one of the generators. If, for example, the first generator were to fail, the power system would compensate by providing power to all buses through the remaining generator.

Relays create an electrical path between each side of the power system circuitry. Such a scenario, however, can overload the remaining generator, resulting in its failure as well. Most power systems, therefore, also include a battery backup for providing supplemental power to the electrical system if one or both of the generators fail. The battery feeds power to the emergency busses and the essential busses.

Assuming a scenario where one engine in a two engine configuration malfunctions, the drive for the associated generator would also be lost. If, for example, the first generator becomes inoperable, the second generator would then be responsible for powering the entire electrical system. Under these circumstances, the second generator can become overloaded. If it overheats or fails, the aircraft is left with mere battery power. This is an unfortunate situation because typically the battery would provide emergency power for a minimum of 30 minutes of operation for FAA (Federal Aviation Administration) regulated flight, or 60–90 minutes for CAA (Civil Aviation Authority in Great Britain) or JAA (Joint Aviation Authority in Europe) regulated flight.

IFR (Instrument Flight Rule) operations are typically met in the United States with a battery that operates for 30 minutes to back up power from the generators. In the scenario where a pilot loses both generators, the pilot must quickly find the nearest airport and land, otherwise all power will be lost resulting is a black cockpit, or worse in the case of "fly by wire" aircraft, a mechanically un-operational aircraft.

Failure of power generation systems can potentially cause loss of enough equipment on the aircraft that a pilot would not be able to maintain continued safe flight or landing. Continued electrical power is especially critical in "fly by wire" aircraft, where a lack of necessary redundancy and discontinued power generation in such aircraft can result in complete aircraft inoperability.

What is needed is a system that provides enough electrical power system separation and redundancy to maintain safe flight and landing of aircraft, regardless of partial system malfunction or loss.

SUMMARY OF THE INVENTION

In accordance with the present invention, a redundant aircraft DC power system is provided. The redundant DC electrical power system for aircraft comprises a primary power system including a transmission driven power generator, dedicated generator control unit and an isolated distribution network that further includes electrical busses for providing sufficient capacity to electrical loads on the aircraft. The DC electrical power system also provides an emergency power system including at least one engine driven starter generator with an associated controller unit and associated distribution network that is isolated from the primary power system. The emergency power system provides sufficient backup capacity to the aircraft electrical loads in the event that the primary power system fails.

In one embodiment, the power generation system includes at least three generators for providing normal and emergency DC power to an aircraft electrical system and components. The primary power system includes a transmission driven DC power generator, a dedicated generator control unit and a distribution network that includes busses for providing sufficient capacity to all electrical loads on the aircraft. The emergency power system includes two engine driven starter generators, each with an associated controller unit and associated distribution network for providing sufficient backup capacity to electrical loads assigned to each generator. Each starter generator system is sufficient to start its own engine and provide all emergency electrical loads assigned to it. An aircraft battery of sufficient capacity to start the engines and supply ground power prior to engine start up would complete the aircraft electrical power system. A battery, unlike prior systems, is not considered the emergency electrical power source for the aircraft when implementing in the present inventive system.

The primary and emergency power generation systems and their respective busses are isolated from each other when all generators are on line. This prevents ground or high voltage faults from affecting all of the equipment while a fault is being cleared.

The equipment busses are set up so that emergency busses have three power sources and three paths. The emergency busses contain equipment necessary for continued safe flight and landing. The essential and main power busses have two power sources and two paths. The nonessential bus has one power source.

The DC power system of the present invention provides electrical power to the fight controls, avionics, and electrical subsystem equipment without need for a heavy battery or inefficient backup system for emergency electrical power.

BRIEF DESCRIPTION OF THE DRAWINGS

For a more complete understanding of the present invention, including its features and advantages, reference is now made to the detailed description of the invention, taken in conjunction with the accompanying drawings in which like numerals identify like parts and in which.

DETAILED DESCRIPTION OF THE INVENTION

While the making and using of various embodiments of the present invention is discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the invention.

Although reference will be made to two engine tilt rotor aircraft throughout this description, it should be appreciated by those skilled in the art after the following teachings that the redundant power system can be implemented in numerous aircraft with the provision auxiliary power generation sources and starter generators.

Figure 1:
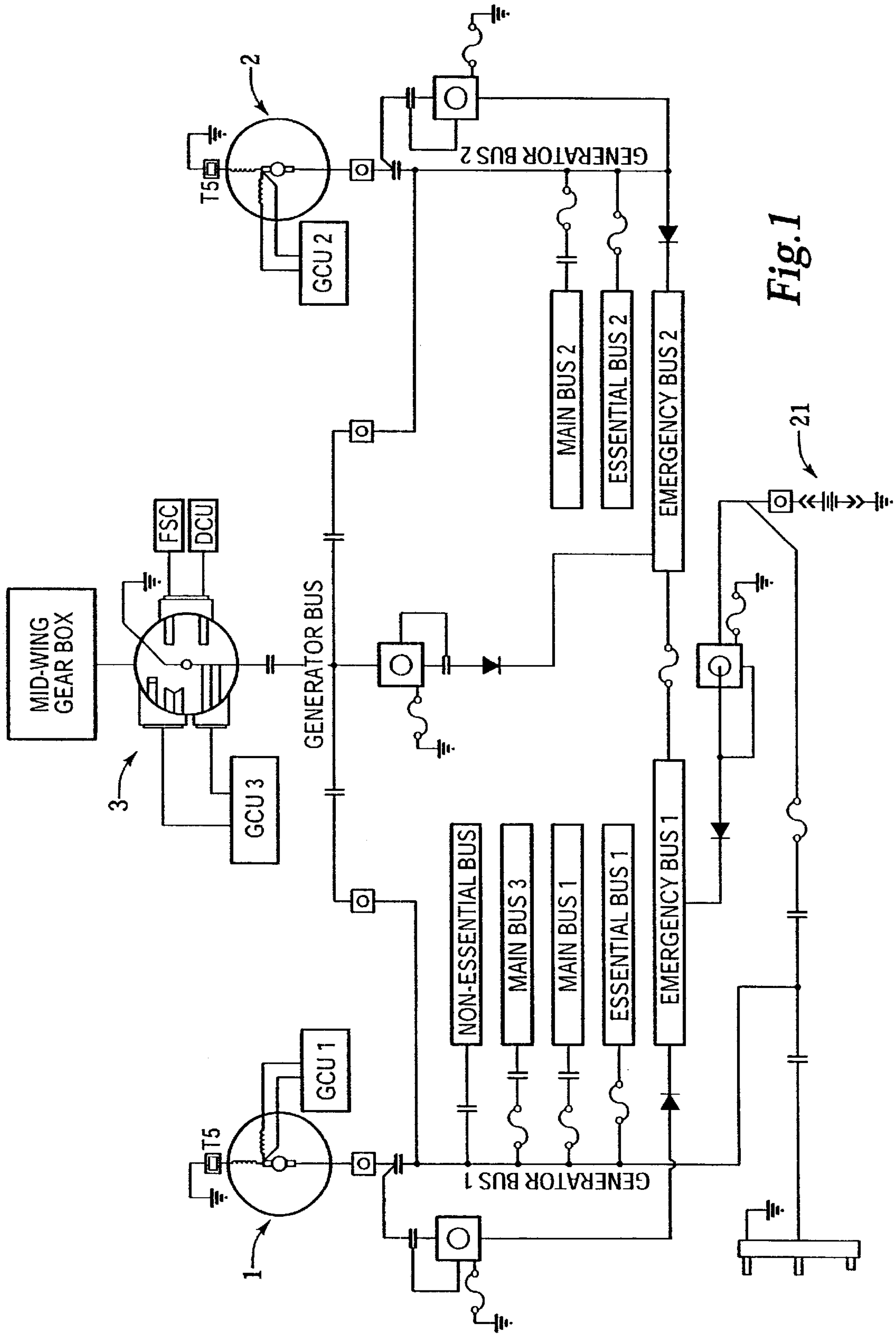
FIG. 1 is a schematic diagram of the DC electrical power system of the present invention.

Referring to FIG. 1, a schematic diagram of components associated with the invention are described. Several busses are shown in FIG. 1. The emergency busses are used to provide power to the most critical equipment for safe flight and landing of the aircraft. The essential busses are provided as backup to the emergency busses or for equipment that is considered essential for flight, but not critical. If power to the emergency busses is lost, an aircraft could be flown and landed with power from the essential busses. The main busses 1–3 are used for components such as windshield wipers that, although considered essential, are not vital for emergency operation and landing of an aircraft. The non-essential busses are for items, such as kits, high power search lights, etc., that are not essential for flight at all. Nonessential busses provide power to items that are primarily used for comfort and convenience.

The power distribution system is divided into three generator busses and multiple equipment busses. The primary, transmission driven generator 3 feeds electrical power to the busses it services through a generator line contactor K3 on relays K4 and K5. The emergency starter generators 1, 2 which are numbered after their respective engine, have dual generator line contactors, K1 and K7 and K2 and K6, respectively. Generator 1 feeds emergency bus #1. Generator 2 feeds emergency bus #2. With the present invention the battery 21 is only used for pre-flight and to start the engines.

Although generator 3 could normally be viewed as a backup power source, it is desirable to utilize it as the aircrafts primary electrical power source. Generators 1, 2 would then serve as backup power sources. The benefits of utilizing generator 3 as the primary will become clear when considering equipment selection and operational efficiency as will be discussed in further detail below. Instead of being tied to the mechanical operation of a single engine, generator 3 is mechanically influenced by an independent source. The source of mechanical power for generator 3 can be the transmission and/or drive shaft in the case of tilt rotor aircraft, or another auxiliary means of mechanical power. Some examples of auxiliary mechanical power generators include: a ram air turban generator or a hydraulically driven generator.

Figure 2:
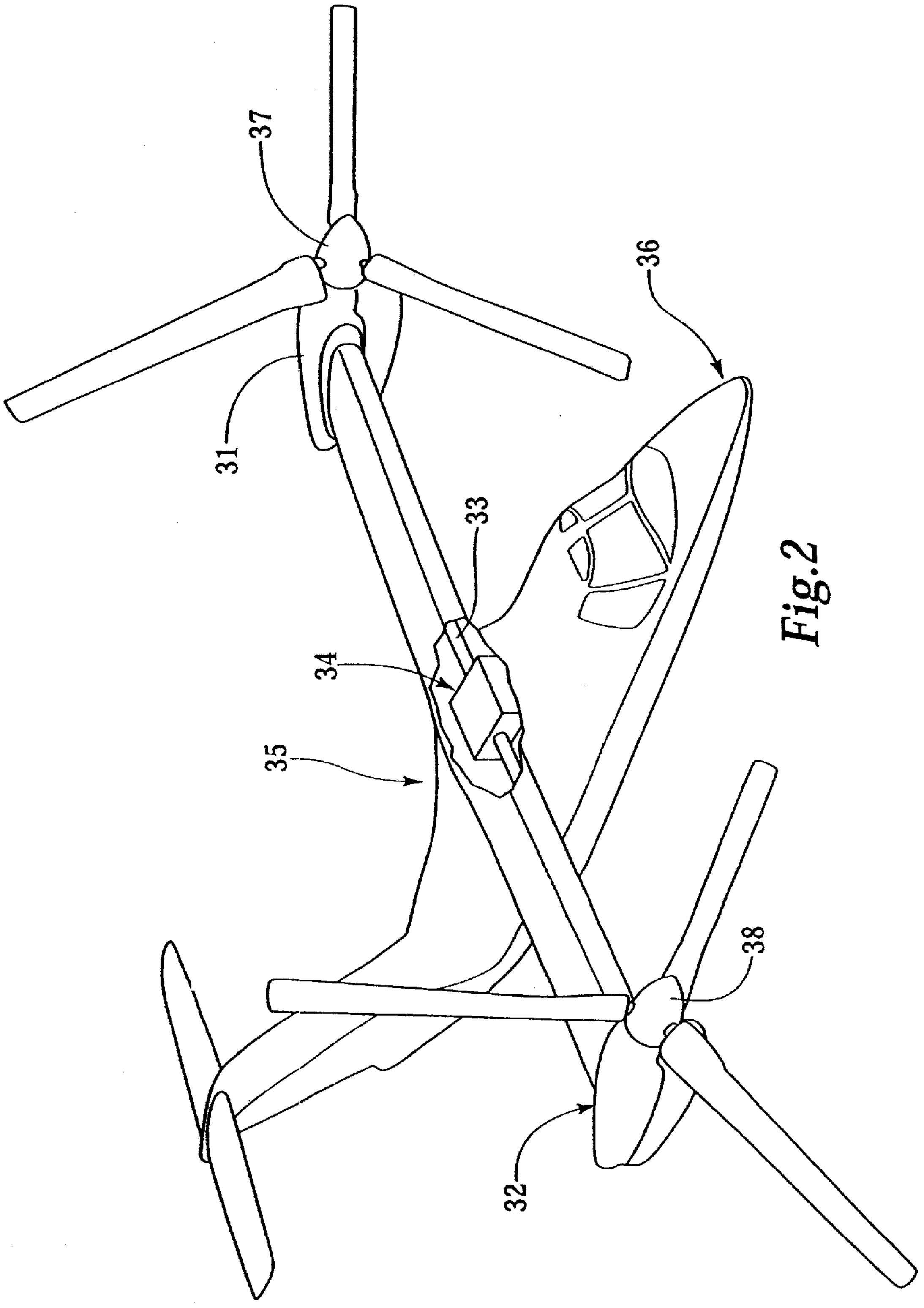
FIG. 2 is a cutaway perspective view of a tilt rotor aircraft wherein the location of the generators are indicated and the drive shaft is exposed through the cutaway portion.

Referring to FIG. 2, generator 3 is run off power from a midwing transmission, which is generally located within the area 35 of the tilt rotor aircraft 36. The transmission is driven by the cross shaft which is geared to the rotors 37 and 38. Both rotors can be powered off a drive shaft 33. Essentially, all three generators are driven by the two engines 31 and 32 and the drive shaft 33 because the drive shaft 33 is connected to both engines through a clutching mechanism (not shown). The tilt rotor aircraft 36 cannot operate if both engines are not operational except for autorotation. In the event one engine fails, both prop rotors can function off one engine through the drive shaft and clutching mechanism associated with the transmission. During normal operation, generator 3 gets its mechanical power from the drive shaft, where generators 1, 2 get their power off of their respective engines 31 and 32.

Below each rotor 37 and 38 is a transmission and an engine, shown generally as 31 and 32. So the engine drives the transmission at each side, but then from the transmission is a shaft that goes across the wing so that if one engine is operating, it can drive both rotors. Because the transmission has a main drive shaft 33 that runs from side to side, generator 3 is easily able to tap off of the drive shaft for mechanical power. The drive shaft is always rotating because it is tapped into both rotors and engines through their respective clutches. Generator 3 is driven anytime the rotors are turning. Normally, generator control and distribution equipment is located in an electronics equipment bay, while equipment busses are located in the cockpit and maintenance access areas.

In order to achieve more reliability and the necessary redundancy for the aircraft 36, it is preferable that three independent and isolated power sources and/or paths to the electrical power busses be provided. The present DC power system provides increased reliability by virtue of its independently driven three generators and the isolation techniques incorporated into the bus distribution architecture. The three generators connected in the manor shown in FIG. 1 are extremely fault tolerant. They provide a higher level of redundancy and isolation between normal and emergency equipment. Additionally, they provide a significantly higher emergency power load level than available from a battery and can, therefore, keep more equipment operating. Modern aircraft utilizing fly-by-wire flight control systems and an increased reliance on avionics need a reliable fault tolerant DC power system with an emergency power system adequate to power all of the equipment required for flight and landing. Using a battery or alternate power unit (APU) as an emergency power source is significantly heavier than using starter generators which are already required for engine starting. Using the transmission driven generator as the primary power source is significantly more efficient. The horsepower savings can result in increased hot day lift performance that compensates for the additional weight of the generator and transmission. The net result is greater redundancy and lighter equivalent weight.

Referring to FIG. 1, some of the power system and circuitry operation will now be described. During normal aircraft operation relays K3, K4 and K5 are closed. Electrical power is provided from generator 3 through the conductive paths (wiring) caused by the closure of the relays to the main busses 1–3, the essential busses 1–2 and the non-essential bus. The relay K7 is open, the relay K1 is closed and starter generator 1 to provide power to the emergency bus 1. The relay K6 is open, the relay K2 is closed and the generator 2 to provide power to emergency bus 2.

If the generator 1 were to malfunction, relay K1 would open and the generator 3 would power the emergency bus 1 through the emergency bus tie CR30. Similarly, if the generator 2 malfunctioned, the relay K2 would open and the generator 1 would power the emergency bus 2 through the emergency bus tie CR30.

In the event that the generator 3 were to malfunction, the relays K4 and K5 would open. The relay K6 would close, allowing the generator 1 to power the main busses 1 and 3, the essential bus 1, the emergency busses. The non-essential bus would not be powered. The relay K7 would close and allow the generator 2 to power the main bus 2, the essential bus 2 and the emergency busses.

In the event that generators 1 and 2 fail, the generator 3 would power the emergency busses 1 and 2 through the emergency bus tie CB30 and the closure of the relay K21.

If generator 3 and one of the starter generators would both fail, leaving a single starter generator, then closure of the relays K5 and K4, and either relay K6 or K7 would allow the entire system to be powered by one starter generator.

Finally, if all three generators were to fail, which is extremely improbable given the redundancy of the present system, then the battery 21 would provide power to at least the emergency busses 1 and 2 through the closure of the relay K22 and the opening of relays K4–K7, K15, K17, K19 and K20.

Current sensors T1–T6 indicate the presence and location of a fault (e.g., high current or shortage is in the circuit ). T3 and T4 are more accurate sensors. T3 and T4 are current type sensors and are used with T5 and T6 to determine differential problems. T3 and T5 operate as a pair. T4 and T6 operate as a pair on the opposite side of the circuit from T3 an T5. The sensors measure the current magnitude and if a large difference in current is sensed, then it indicates by signaling a controller. They work on absolute value and if that value differs by a certain margin or the current level is too high for a period of time, then they trip off.

Figure 3:
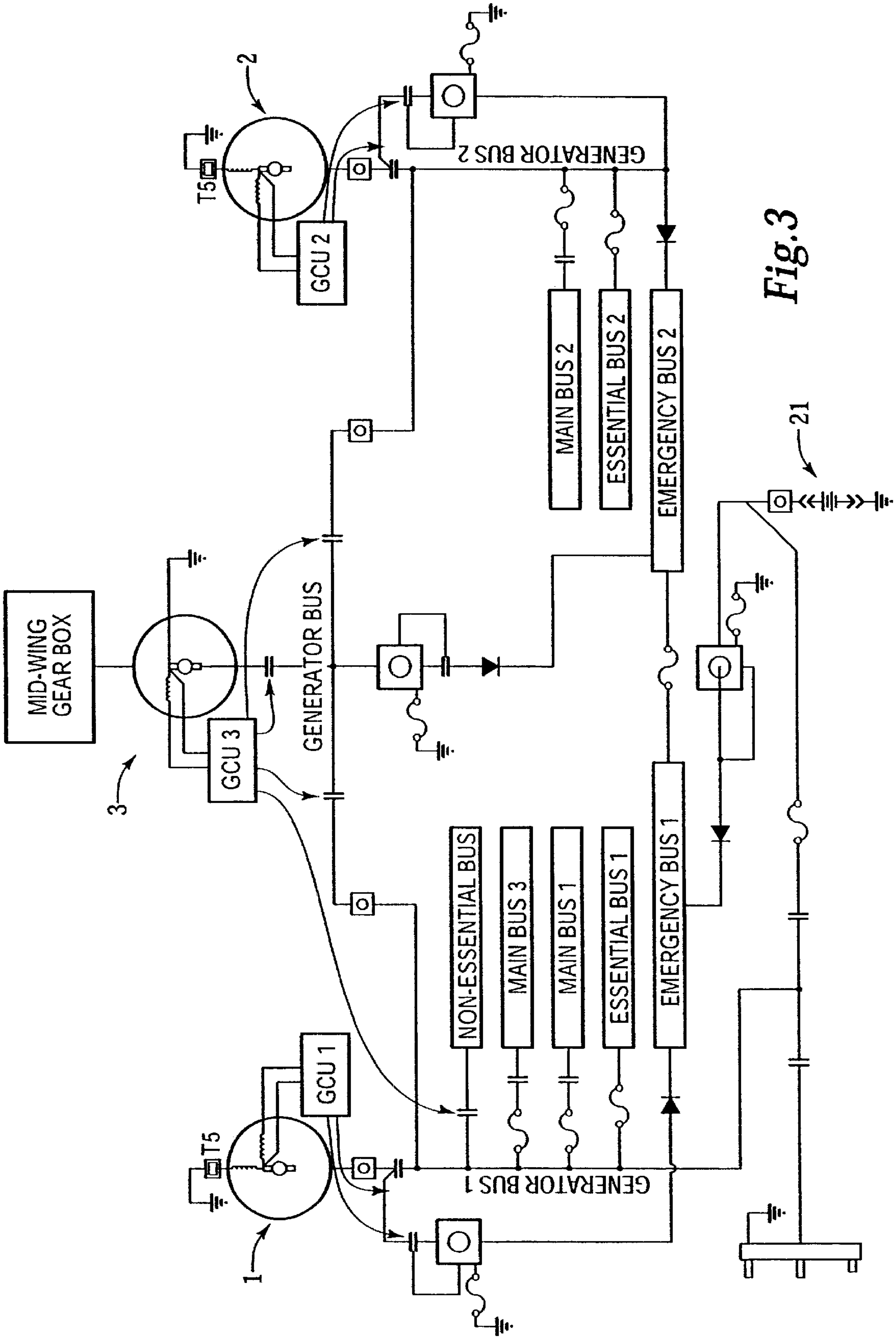
FIG. 3 illustrates a schematic diagram of the relationship of controllers to sensors and relays for the generators of the present invention.

Referring to FIG. 3, separate generator control units GCU1–3 manage their respective generators 1–3. Inputs from the sensors are provided to the respective controllers. Although it is preferable that separate controllers be employed for redundancy, a single controller could manage all three generators, sensor inputs, and circuit relay switches. It is preferred that each controller handles a part of the bus logic. Rather than having separate logic units, the generator control units each perform part of the bus control function wherein GCU1 and GCU2 are software driven control units. Main control is conducted by GCU3 which is a analog unit. So, in essence, two types of technology are being used for independence, analog and software. Separate controllers and differing technology provides isolation and independence which is very important for compliance with FAA requirements for highly reliable redundant systems. The generators 1,2 are microprocessor controlled and use similar software. The microprocessor and software for each generator reside in the GCUs.

The busses are typical circuit breakers with a bus bar in between them. Power is taken off of each respective bus bar for all the different electrical components to run the aircraft. The bus structure allows less essential equipment busses and the generator power busses to be out of the cockpit. This reduces weight and the number of circuit breakers required in the cockpit. Bus switches are used to isolate power to busses not located in the cockpit.

The preferred equipment choice and resulting efficiency of the present system will now be described. The use of generator 3, the transmission drive generator, as the aircraft's primary electrical power generator, and generators 1 and 2 as backups, overcomes weight issues. The present three generator DC power system is lighter (when lift is factored in) than a two generator power system with a battery that is large enough to provide 60 minutes of emergency power for a fly by wire aircraft. Furthermore, the reduction in wire weight achieved by the use of emergency generators provides additional weight savings. The power system can be modified to use an independent light weight PMG inside the generator 3 as an independent power source. Additionally, isolated PMGs may be used inside of AC generators if those generators are available. The independent emergency power source may be used to provide an alternate power source for critical equipment such as flight control computers, flight sensors and standby instruments.

Starter generator 2 is the same as starter generator 1. A Lucas™ generator, for example, can deliver 300 amps and can be derated to 220 amps for temperature concerns. The generator 3 is a 400 amp brushless AC generator that has been fullwave rectified to produce the DC power. The generator 3 is a brushless generator that is typically considered to be more reliable and more efficient. The battery 21 is about a 28 amp per hour battery. It's preferably a nicad battery and provides sufficient power to start at cool temperatures.

The following is an example of how the power system, if incorporated into a rotorcraft, improves overall aircraft efficiency and power system redundancy. Using a starter generator driven from an engines compressor turbine as the normal power source can rob the engine of as much as 3 times the horsepower that it takes to generate the same power from a generator driven from a gearbox powered by the engine's power turbine. The lost horsepower equates to a loss of lift and can be a limiting factor in some flight conditions. A gearbox driven generator uses less horsepower and allows the starter generators to be backup generators for emergency power use. Additionally, the transmission driven generator can restart the engine "in flight" without the need of the battery. A tilt rotor aircraft has two turbine sections. One turbine section drives the transmission, and one drives the compressor. If torque is pulled off of the engine, that power is pulled off of the compressor. As much as three horse power is lost for every horse power you used to run the a typical generator which affects overall efficiency. If the electrical loads on the engines can be reduced, more lift will result. Therefore, the aircraft can carry a higher payload if a system is used that doesn't tax the aircraft engines' efficiency. In essence, by adding the generator 3, thereby not using the starter generators, the torque requirements on the aircraft engines are reduced. Lift requirements are regained which may translate into as much as 100 lbs.

The generators 1, 2 are essentially provided weight-free because they're also used to start the engines. The generator 3 is also theoretically free because it is used as a primary generator, thereby unloading the starter generator which unloads the compressor and promotes engine efficiency. With the present system, a battery is no longer needed as emergency power source. As a result, more equipment is kept powered up, resulting is a safer aircraft. The emergency loads can be much higher than they would be with a system using a battery as an emergency source. Using a smaller 28 amp battery to start the engine versus using a 64–80 amp battery translates into weight savings. For example, an 80 amp battery can weigh about 150 lbs. A 28 amp battery will way far less at about 60 lbs.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is, therefore, intended that the appended claims encompass any such modifications or embodiments.

What is claimed is:

1. A redundant DC electrical power system for an aircraft having at least two rotors mechanically driven by a common main driveshaft, comprising:

a primary power system including a power generator driven by said common main driveshaft, a dedicated generator control unit and an isolated distribution network that further includes electrical busses for providing sufficient capacity to electrical loads on the aircraft; and an emergency power system including at least one engine driven starter generator with an associated controller unit and associated distribution network that is isolated from the primary power system, the emergency power system for providing sufficient backup capacity to the aircraft electrical loads in the event that the primary power system fails.

2. The system of claim 1 further comprising a battery of sufficient capacity to start aircraft engines and supply ground power to the aircraft prior to engine start up.

3. The system of claim 1 wherein the at least one starter generator is sufficient to start the engine associated therewith and to provide all emergency electrical loads assigned thereto when operating in power generation mode.

4. The system of claim 3 further comprising a battery of sufficient capacity to start aircraft engines and supply ground power to the aircraft prior to engine start up.

5. The system of claim 1 wherein said power generation systems and their associated distribution systems are sufficiently isolated form each other.

6. A redundant DC electrical power system for an aircraft having at least two rotors mechanically driven by a common main driveshaft, comprising:

a primary power system including a power generator driven by said common main driveshaft and an associated electrical power distribution network for providing sufficient capacity to electrical loads on the aircraft;

an emergency power system including at least two engine driven starter generators and associated distribution networks that are isolated from the primary power system, the emergency power system for providing sufficient backup capacity to the aircraft electrical loads in the event that the primary power system fails; and a controller associated with each generator for sensing system faults and redirecting power distribution from said emergency power system and primary power system to compensate for faults.

7. The system of claim 6 further comprising a battery of sufficient capacity to start aircraft engines and supply ground power to the aircraft prior to engine start up.

8. The system of claim 7, wherein each starter generator is sufficient to start the engine associated therewith and to provide all emergency electrical loads assigned thereto.

9. The system of claim 8 further comprising a battery of sufficient capacity to start aircraft engines and supply ground power to the aircraft prior to engine start up.

10. The system of claim 6 wherein the primary power source provides power to main and essential busses.

11. The system of claim 10 wherein the emergency power system provides power to the emergency busses.

12. A three generator DC power system for a tilt rotor aircraft having at least two rotors mechanically driven by a common main driveshaft, comprising:

a primary power generator driven by said common main driveshaft, dedicated primary control unit and primary distribution network for providing sufficient primary electrical capacity to all electrical loads on the aircraft; and an emergency power system including two engine driven starter generators, each with an associated controller unit and associated distribution network for providing sufficient backup capacity to electrical loads assigned to each generator in the event of a failure by the primary power generator.

13. The system of claim 12, wherein each starter generator is sufficient to start the engine associated therewith and to provide all emergency electrical loads assigned thereto.

14. The system of claim 12 further comprising a battery of sufficient capacity to start the engines and supply ground electrical power to the aircraft prior to engine start up.

* * * * *